(12) United States Patent
Johnson

(10) Patent No.: US 12,104,312 B2
(45) Date of Patent: Oct. 1, 2024

(54) BRACKET FOR A CLOTHESLINE ASSEMBLY AND A CLOTHESLINE ASSEMBLY

(71) Applicants: David Johnson, Ocean Shores (AU); Kelly Galbraith, Ocean Shores (AU)

(72) Inventor: David Johnson, Ocean Shores (AU)

(73) Assignees: David Johnson, Ocean Shores NSW (AU); Kelly Galbraith, Ocean Shores NSW (AU)

( * ) Notice: Subject to any disclaimer, the term of this patent is extended or adjusted under 35 U.S.C. 154(b) by 248 days.

(21) Appl. No.: 17/533,208

(22) Filed: Nov. 23, 2021

(65) Prior Publication Data

US 2022/0170198 A1 Jun. 2, 2022

Related U.S. Application Data

(63) Continuation of application No. 29/785,559, filed on May 26, 2021.

(30) Foreign Application Priority Data

Nov. 27, 2020 (AU) ................................ 2020904399
Aug. 11, 2021 (AU) ................................ 2021902487

(51) Int. Cl.
*D06F 53/04* (2006.01)
*F16M 13/02* (2006.01)

(52) U.S. Cl.
CPC ............. *D06F 53/04* (2013.01); *F16M 13/02* (2013.01)

(58) Field of Classification Search
CPC ........ D06F 53/04; D06F 53/045; D06F 57/12; F16M 13/02

(Continued)

(56) References Cited

U.S. PATENT DOCUMENTS 830,469 A * 9/1906 Weaver ................... D06F 53/04
                                                                                211/119.1
1,329,855 A * 2/1920 Rogers .................... D06F 53/04
                                                                               211/119.16

(Continued)

FOREIGN PATENT DOCUMENTS

AU        2016100573 A4    6/2016
AU        2016101664 A4   10/2016

(Continued)

OTHER PUBLICATIONS

Search Report issued in corresponding Australian Patent Application No. 2020904399 on Oct. 20, 2021, consisting of 21 pp.

*Primary Examiner* — Stanton L Krycinski
(74) *Attorney, Agent, or Firm* — Volpe Koenig

(57) ABSTRACT

A bracket for a clothesline assembly, a clothesline assembly, and a method of fabricating a bracket for a clothesline assembly. The bracket comprises a first arm; and a second arm connected to the first arm at a vertex point such that the first and second arms extend from the vertex point to first and second mounting points of the first and second arms, respectively; wherein each of the first and second arms are configured to be mounted to a support structure at the first and second mounting points, respectively; wherein the first arm is configured to have a plurality of end terminals of respective strand sections connected thereto along a length of the first arm; and wherein the first arm is curved such that a convex surface of the first arm faces away from the second arm and such that the vertex point, the first mounting point and the second mounting point define a triangle in which an internal angle between a side of the triangle defined by the vertex point and the first mounting point, and a base of the triangle defined by the first and second mounting points is less than 90 degrees.

8 Claims, 6 Drawing Sheets

(58) Field of Classification Search
USPC .......................................... 211/119.01, 119.1
See application file for complete search history.

(56) References Cited

U.S. PATENT DOCUMENTS

| | | | | | |
|---|---|---|---|---|---|
| 1,720,493 | A | * | 7/1929 | Oyen ....................... | D06F 53/04 |
| | | | | | 24/131 R |
| 2,141,032 | A | * | 12/1938 | Cordell ................... | D06F 53/04 |
| | | | | | 248/74.1 |
| 2,194,967 | A | * | 3/1940 | Beers, Sr. ............. | E04H 17/124 |
| | | | | | 24/131 R |
| 2,436,477 | A | * | 2/1948 | Lewis ..................... | D06F 53/04 |
| | | | | | 211/119.15 |
| 2,600,725 | A | * | 6/1952 | Bahls ...................... | D06F 53/04 |
| | | | | | 211/119.07 |
| 6,056,131 | A | * | 5/2000 | Mowbray ............... | E04H 15/48 |
| | | | | | 211/104 |

FOREIGN PATENT DOCUMENTS

FR            2587379 A1 * 3/1987
GB            305248 A * 1/1929

* cited by examiner

BRACKET FOR A CLOTHESLINE ASSEMBLY AND A CLOTHESLINE ASSEMBLY

CROSS-REFERENCE TO RELATED APPLICATION

This application claims the benefit of priority of United States Patent Application claiming priority to Australian Provisional Patent Application No. 2020904399 filed Nov. 27, 2020; Australian Design Patent Application No. 202016447 filed Nov. 27, 2020; U.S. Design Patent application Ser. No. 29/785,559 filed May 26, 2021; and Australian Provisional Patent Application No. 2021902487 filed Aug. 11, 2021, the content of each of which is incorporated herein by reference in its entirety for all purposes.

FIELD OF INVENTION

The present invention relates broadly to a bracket for a clothesline assembly, to a clothesline assembly, and to a method of fabricating a bracket for a clothesline assembly.

BACKGROUND

Any mention and/or discussion of prior art throughout the specification should not be considered, in any way, as an admission that this prior art is well known or forms part of common general knowledge in the field.

Many existing wall or post mounted clothesline assemblies include a peripheral frame, typically of a rectangular shape or outline, with the two shorter ends being connected to a wall or post mounting bracket. Generally, the coupling between the bracket and the frame is such that the frame can be folded from a use-orientation, in which the frame is horizontally orientated, into a storage-orientation, in which the frame is vertically orientated. Sections of clothesline extend between the short ends of the frame. Typically, a continuous strand cable is looped around the frame, and may be tensioned at one end thereof by a knot or a clamp arrangement. This makes achieving a desired tension for each section of the clothesline difficult and cumbersome. Also, there is a lack of flexibility to accommodate tension variations whilst clothes are on or off the line and/or between the use- and the storage-orientation.

Australian Innovation patent no. 2016101664 describes an alternative clothesline assembly in which a pair of brackets are mounted to a wall or post with sections of strand cable extending between straight cable mounting arms of the respective brackets. The straight cable mounting arms extend perpendicularly relative to the wall or post surface in the use-orientation and are integral with a support arm that connects the end of the straight cable mounting arm away from the wall or post surface back to a mounting base plate on the wall or post. The strand cable sections extending between the opposing straight cable mounting arms are individually tensioned using adjustable thread terminals or the like. In this design, a problem exists that achieving evenly tensioned strand cable sections can be difficult, including due to distortion of the straight cable mounting arms as a result loading during sequential tensioning, strand cable fixing point stresses, loss of shape and slack line sections etc. Also, a lack of flexibility to accommodate tension variations whilst clothes are on or off the line and/or between the use- and the storage-orientation remains.

Embodiments of the present invention seek to address at least one of the above problems.

SUMMARY

In accordance with a first aspect of the present invention, there is provided a bracket for a clothesline assembly, the bracket comprising:
a first arm; and
a second arm connected to the first arm at a vertex point such that the first and second arms extend from the vertex point to first and second mounting points of the first and second arms, respectively;
wherein each of the first and second arms are configured to be mounted to a support structure at the first and second mounting points, respectively;
wherein the first arm is configured to have a plurality of end terminals of respective strand sections connected thereto along a length of the first arm; and
wherein the first arm is curved such that a convex surface of the first arm faces away from the second arm and such that the vertex point, the first mounting point and the second mounting point define a triangle in which an internal angle between a side of the triangle defined by the vertex point and the first mounting point, and a base of the triangle defined by the first and second mounting points is less than 90 degrees.

In accordance with a second aspect of the present invention, there is provided a clothesline assembly comprising:
a pair of brackets as defined in the first aspect;
the plurality of strand sections; and
pairs of the end terminals for interconnecting each strand section and the first arms of each bracket.

In accordance with a third aspect of the present invention, there is provided a method of fabricating a bracket for a clothesline assembly, the method comprising the steps of:
forming a first arm and a second arm of the bracket such that the first and second arms extend from a vertex point to first and second mounting points of the first and second arms, respectively;
configuring the first and second arms to be mounted to a support structure at the first and second mounting points, respectively; and
configuring the first arm to have a plurality of end terminals of respective strand sections connected thereto along a length of the first arm;
wherein the first arm is curved such that a convex surface of the first arm faces away from the second arm and such the vertex point, the first mounting point and the second mounting point define a triangle in which an internal angle between a side of the triangle defined by the vertex point and the first mounting point, and a base of the triangle defined by the first and second mounting points is less than 90 degrees.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a bracket for a clothesline assembly and a clothesline assembly, with improved flexibility to accommodate tensioning of individual clothesline sections and tension variations whilst clothes are on or off the line and/or between the use- and the storage-orientation.

In one embodiment, the clotheslines assembly comprises two brackets with curved arms, as will be described in more detail below.

Figure 1A:
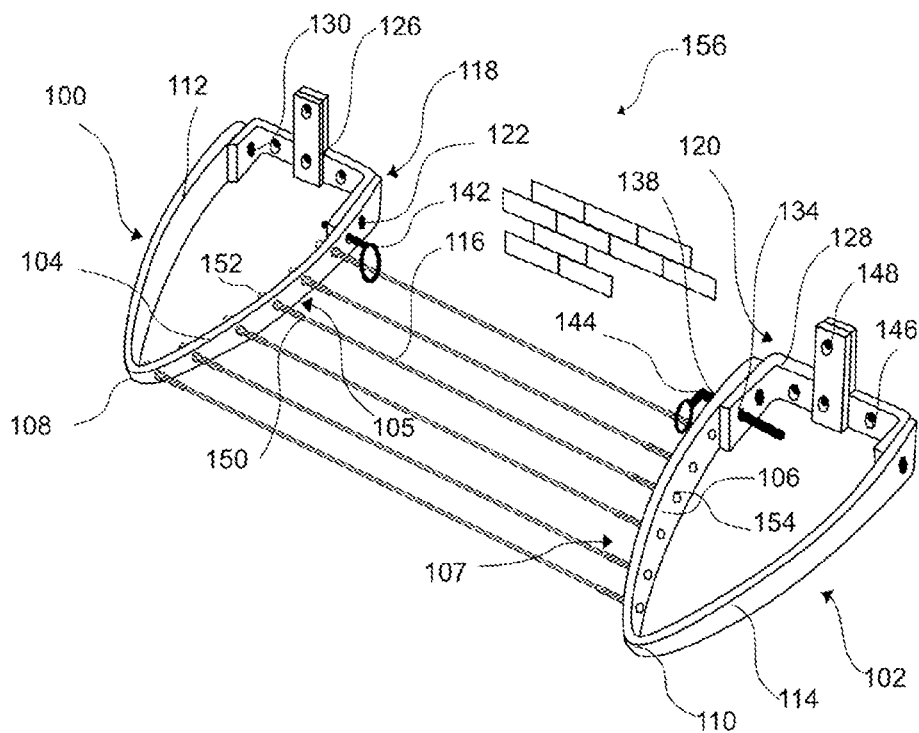
FIG. 1A is a schematic drawings illustrating brackets according to an example embodiment for a clothesline assembly and the clothesline assembly according to an example embodiment, in a use-orientation (folded-up).

With reference to FIGS. 1A and B, a clothesline assembly 156 according to an example embodiment comprises two brackets 100, 102 each having a first curved arm 104, 106 extending from a vertex point 108, 110 and a second curved arm 112, 114 extending from the same vertex point 108, 110. The first arms 104, 106 face each other with strand cable sections, in the form of wire rope sections e.g. 116 in this example embodiment, extending therebetween. The first arms 104, 106 are curved such that convex surfaces 105, 107 of the first arms 104, 106 face away from the second arms 112, 114 for each bracket 100, 102.

Figure 1B:
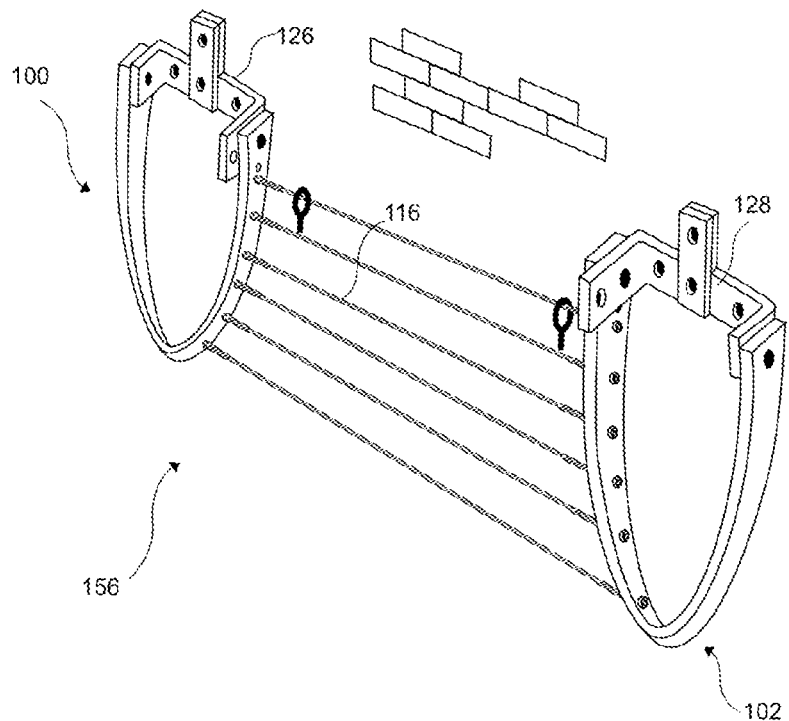
FIG. 1B is a schematic drawing illustrating the brackets and the clothesline assembly of FIG. 1A in a storage-orientation (folded-down).

At the terminating end e.g. 118 of each bracket e.g. 100, a hole e.g. 122 in each of the arms e.g. 104 enables the brackets e.g. 100 to be connected to prongs of U-shaped base plates e.g. 126 with corresponding holes e.g. 130, using a bolt and nut in one example embodiment. This enables pivoting of each bracket 100, 102 for folding down (FIG. 1B) and up (FIG. 1A) purposes. An additional hole e.g. 134 in each U-shaped base plate e.g. 128 and a corresponding hole e.g. 138 in each bracket e.g. 100 enables locking pins e.g. 142 to be inserted through the brackets e.g. 100 and base plates e.g. 126 for locking purposes.

The base plates 126, 128 enable the brackets 100, 102 to be fixed to a wall or post. A plurality of mounting holes e.g. 146, 148 are provided on each base plate e.g. 128 for fixing to the wall or post, for example using screws.

The brackets' 100, 102 material can be metallic or non-metallic flat bar profile. The clothesline assembly 156 further comprises the wire rope sections e.g. 116 with adjustable thread terminals e.g. 150, crimped or fastened at the extremities of the wire rope sections e.g. 116.

The adjustable thread terminals e.g. 150 are inserted through a number of holes e.g. 152, 154 in the opposing curved first arms 104, 106 of the brackets 100, 102 for stranding the wires e.g. 116 horizontally for clothes hanging purposes.

Once the brackets 100, 102 are fixed to the wall or post, or any other suitable structure, and the wires e.g. 116 are connected to the brackets 100, 102, the clothesline assembly 156 can fold down or return to the horizontal or 'fixed' position held with the locking pins 142, 144. In this embodiment, the locking pins 142, 144 are fed onto the strand section closest to the base plates 126, 128 via loops for convenience and to avoid loss thereof.

When adjusting the amount of tension in the wire sections e.g. 116, a person can tighten or loosen the nuts (see e.g. numeral 117 in FIG. 2), e.g. hex nuts engaging the threaded ends (see e.g. numeral 119 in FIG. 2) of the adjustable thread terminals e.g. 150 in order to set the desired tension of the wire sections e.g. 116.

The curved first arms 104, 106 of the bracket 100, 102 thus house the wire sections e.g. 116 via the adjustable thread terminals e.g. 150. Tensioning of the wire sections e.g. 116 creates a preloading force taken up by both the first curved arms 104, 106 and second curved arms 112, 114 of the brackets 100, 102, creating a type of spring-loaded effect. In combination with an improved structural rigidity as a result of triangulation principles, the curved arms of the brackets 100, 102 provide the spring-loaded effect which preferably allows for more efficient, preferably equal, distribution of the preloading force for absorption across the entire bracket, allowing each bracket 100, 102 to substantially retain its shape, rather than being in-elastically deformed/distorted. It is also noted that this is in contrast to, for example, forming the arms of the bracket into an actual triangular shape, i.e. with two inclined straight arms meeting at a pointed tip away from the wall, where the structural rigidity may be maximized but at the cost of providing substantially no spring-loaded effect as a result of that maximized rigidity, which may give rise to inelastic deformation of the bracket under over-tensioning and/or difficulty in achieving evenly tensioned strand cable sections.

Figure 2:
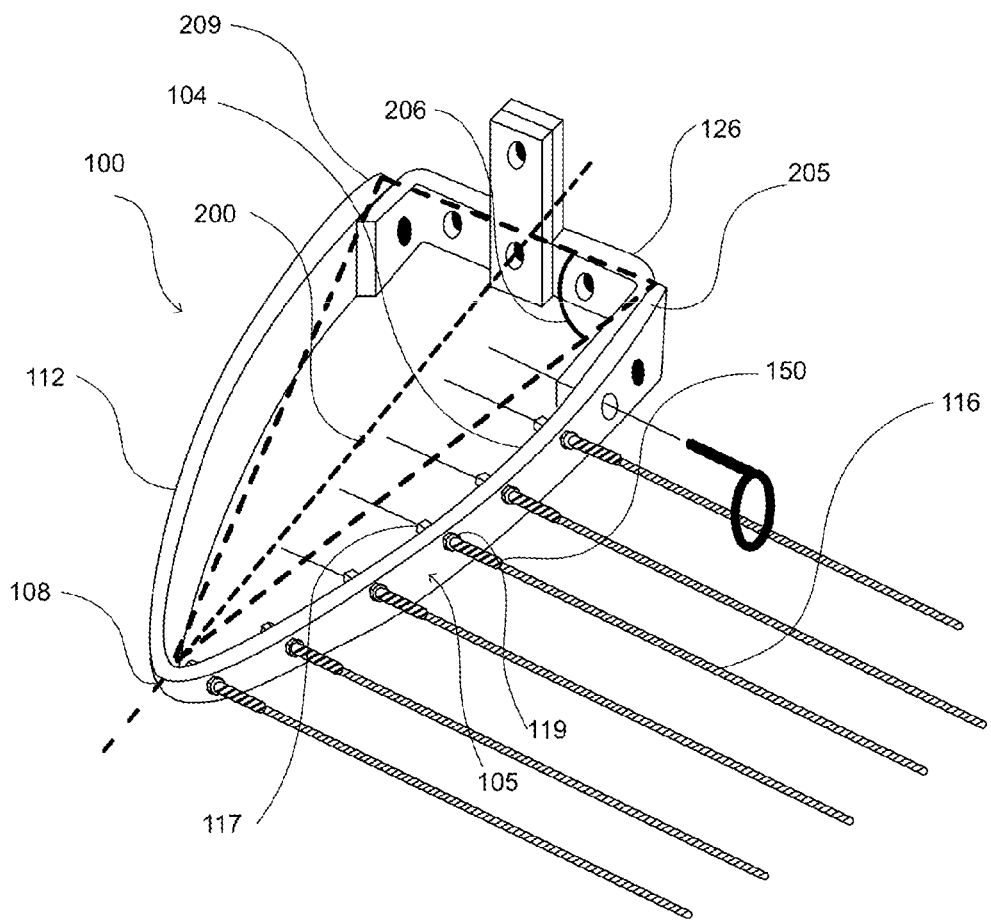
FIG. 2 is a schematic drawing illustrating a close-up of one of the brackets of FIG. 1A.

With reference to FIG. 2, which shows a close-up view of the bracket 100, due to the first arm's 104 curvature, a load force at the connecting point of the adjustable thread terminals e.g. 150 can be transferred through the combined action of bending and stretching of the first arm 104. Because of the curved shape of the first arm 104 with the convex surface 105 facing away from the second arm 112, the vertex point 108 is moved backward compared to a design in which the first arm would be straight and extending perpendicularly from the wall, providing improved strength for the load applied by the wire sections as tension is increased to the desired level. The vertex point 108 and a mounting point 205 on the first arm 104 and a mounting point 209 of the second arm 112 define a triangle in which an internal angle 206 between a side of the triangle defined by the vertex point 108 and the mounting point 205, and a base of the triangle defined by the mounting points 205, 209 is less than 90 degrees. This results in improved strength of the bracket 100 while the curvature of, in particular, the first arm 104 enables a load force transfer through the combined action of bending and stretching, according to example embodiments.

On the other hand, as mentioned above, forming the arms of the bracket into an actual triangular shape, i.e. with two inclined straight arms meeting at a pointed tip away from the wall, would provide substantially no spring-loaded effect and may give rise to inelastic deformation of the bracket under over-tensioning and/or difficulty in achieving evenly tensioned strand cable sections.

As described above, the clothesline assembly 156 (see FIG. 1) according to example embodiments advantageously has flexibility to accommodate tensioning of individual clothesline sections and tension variations whilst clothes are on or off the line and/or between the use- and the storage-orientation with reduced, preferably without distortion of the brackets 100, 102 by keeping the arms 104, 112 below the yield point during loading/tensioning of the wire sections e.g. 116.

It is noted that in one embodiment, one or both of the brackets 100, 102 may be mounted with the base plate e.g. 126 at a small angle (for example 1 or 2 degrees) rather than horizontally, such that the second arm 112 is, in the use-orientation, generally slightly lower than the first arm 104. As a result of this non-horizontal orientation, if the brackets 100, 102 are in the storage-orientation, the distances between the connection points of the wire sections e.g. 116 to the first arms e.g. 104, 106 are slightly shorter than in the use-orientation. Accordingly, as the brackets 100, 104 are moved to the use-orientation, tension in the wire sections e.g. 116 can be "automatically" increased compared to the storage-orientation.

Embodiments of the present invention can provide an improvement over existing clothesline assemblies, which are unable to adequately absorb a pre-loading force from line tensioning and instead result in arm/bracket distortion, fixing point stresses, loss of shape, slack lines, locking pin dis-alignment and pivot point stresses.

The brackets e.g. 100 according to preferred example embodiments are made from a medium hardness material like ferrous or non-ferrous half hardness steel, which advantageously enables cold working in the manufacturing process. In one non-limiting example embodiment, the brackets and base plates are formed from 8×40 mm non-ferrous half hardness steel cold worked in a forming machine into the desired shapes above the yield point and below the fracture point. No heat treatment is required after the cold working in the forming machine to achieve the desired structural strength of the brackets e.g. 100 with small base plates e.g. 126 according to such example embodiments. This advantageously keeps the manufacturing costs lower compared to having to rely on the inherent hardness and/or heat treatment to achieve comparable structural strength in combination with the improved distribution of the load across the bracket (and wires) as described above.

In example embodiments, the first and second curved arms e.g. 104, 112 of the brackets e.g. 100 can be symmetric relative to an axis 200 through the vertex point e.g. 108 and a mid-point of the base plate e.g. 126, or asymmetric. The respective curvatures of the first and second curved arms e.g. 104, 112 of the brackets e.g. 100 may each follow an elliptical quadrant shape or a portion thereof. It will be appreciated that the curvatures may be optimized based on load distribution calculations that would be understood by a person skilled in the art and are not described in detail herein. It is noted, however, that providing, in particular, the first curved arms e.g. 104 generally such that a convex surface of the first arm faces away from the second arm e.g. 112 according to example embodiments, as opposed to those arms being straight, can provide an improved load distribution even without such detailed optimization calculations, which advantageously further reduces manufacturing process complexity.

Figure 3:
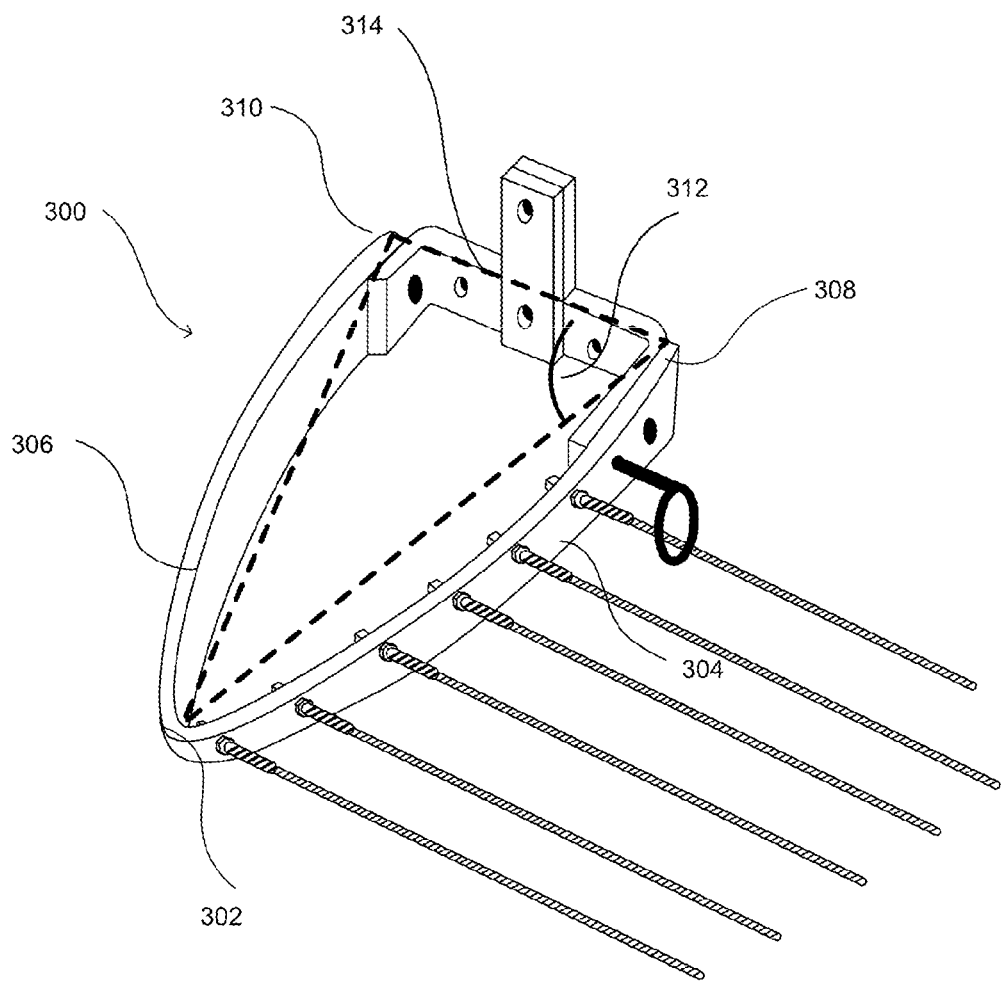
FIG. 3 is a schematic drawing illustrating a close-up of another bracket according to an example embodiment.

For example, FIG. 3 shows a schematic drawing illustrating a close-up of another bracket 300 according to an example embodiment, in which the first arm 304 and the second arm 306 together define a less pointed, half-elliptical type shape around the vertex point 302. The vertex point 302 and a mounting point 308 on the first arm 304 and a mounting point 310 of the second arm 306 define a triangle in which an internal angle 312 between a side of the triangle defined by the vertex point 302 and the first mounting point 308, and a base of the triangle defined by the mounting points 308, 310 is less than 90 degrees. Again, the improved structural rigidity as a result of triangulation principles in combination with, in particular, the first arm 304 of the bracket 300 being curved instead of straight preferably allows for more efficient, preferably equal, distribution of the preloading force for absorption across the entire bracket, allowing the bracket 300 to substantially retain its shape, i.e. without undergoing inelastic deformation.

Figure 4:
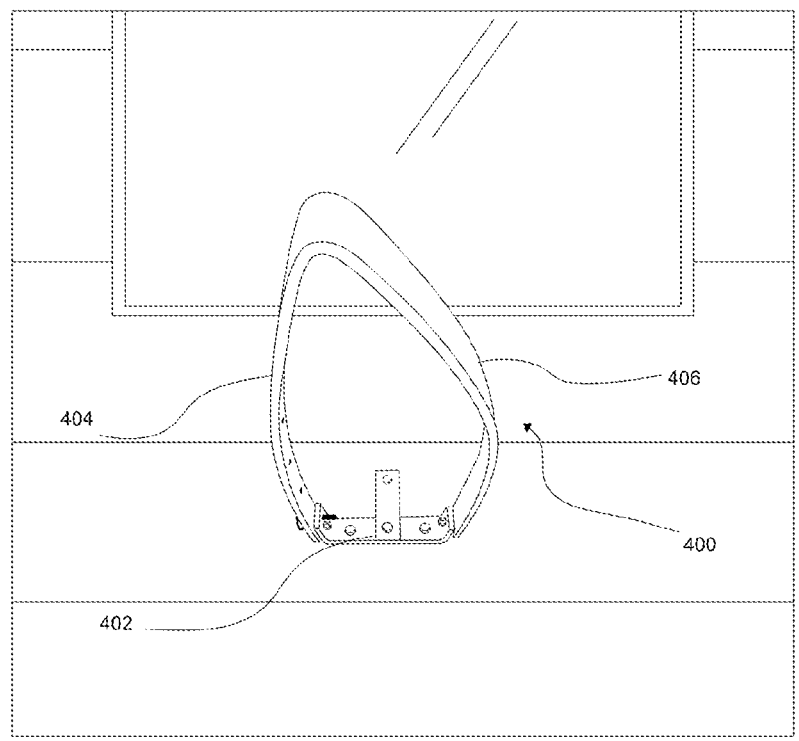
FIG. 4 is a schematic drawing illustrating a bracket according to an example embodiment, mounted to a wall via a base plate, in the use orientation.

FIG. 4 shows a photograph of a bracket 400 with a first curved arm 404 for connecting the wire sections and a second arm 406, here also curved, according to an example embodiment, mounted to a wall via a base plate 402, in the use orientation.

Figure 5:
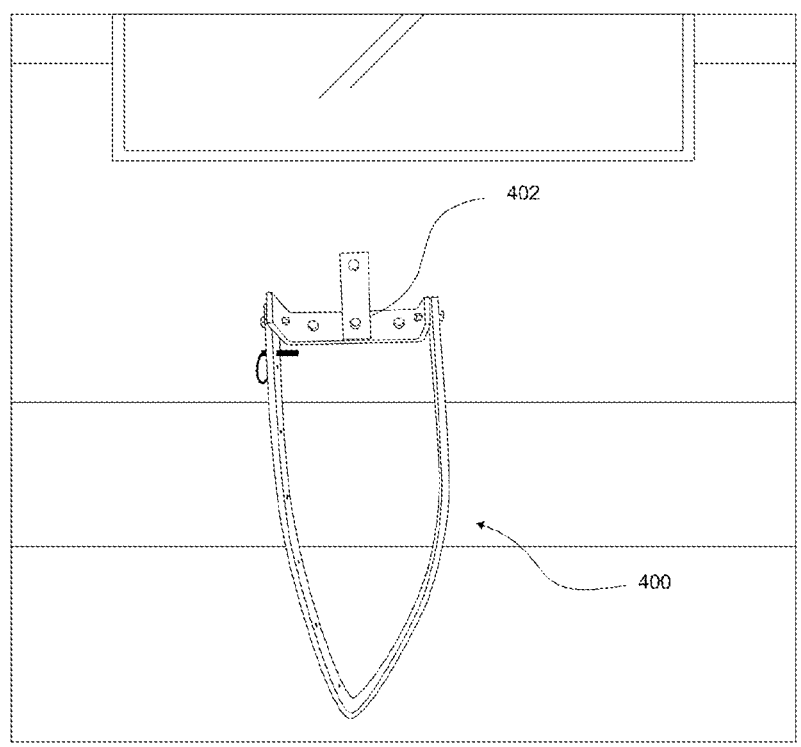
FIG. 5 is a schematic drawing illustrating the bracket and base plate of FIG. 4, in the storage-orientation.

FIG. 5 shows a photograph of the bracket 400 and base plate 402 of FIG. 4, in the storage-orientation.

Figure 6:
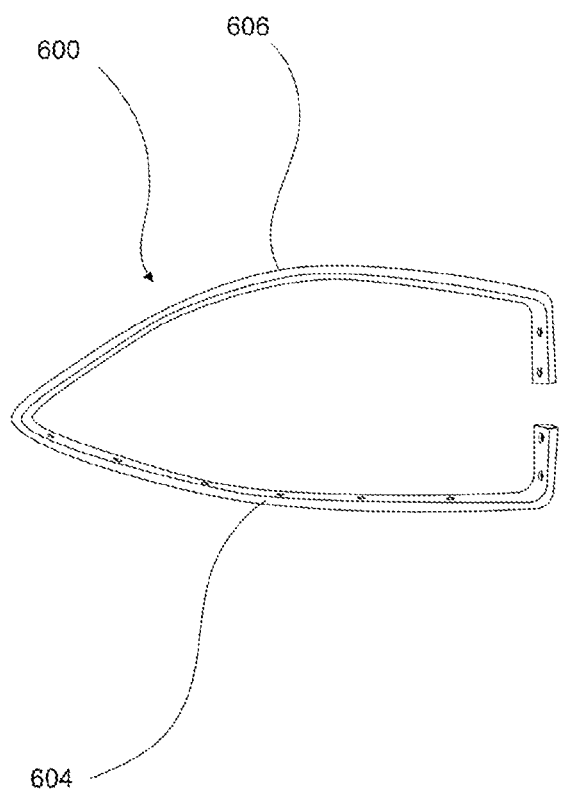
FIG. 6 is a schematic drawing illustrating another bracket according to an example embodiment, for mounting directly to a support structure.

While the brackets according to example embodiments described above with reference to FIGS. 1 to 5 are mounted to the wall or post via base plates, the brackets may be mounted directly to the wall or post, for example by bent extensions of the curved arms of the brackets with mounting holes for receiving mounting screws. Such embodiments may be preferred where it is not required to fold-up and -down the bracket between the use orientation and the storage orientation. FIG. 6 shows a photograph of a bracket 600 with a first curved arm 604 for connecting the wire sections and a second arm 606, here also curved, according to such an example embodiment, for mounting directly to a support structure. It will be appreciated that the bent extensions may be bent outward in a different example embodiment.

Also, while the brackets and base plates according to example embodiments described herein are fabricated from steel by forming machining, different materials and fabricating techniques may be used in different embodiments. For example, carbon fiber, fiber glass or plastics may be used, for example in a molding process; or castings may be used; or 3 dimensional (3D) printing.

In one embodiment, a bracket for a clothesline assembly is provided, the bracket comprising:
a first arm; and
a second arm connected to the first arm at a vertex point such that the first and second arms extend from the vertex point to first and second mounting points of the first and second arms, respectively;
wherein each of the first and second arms are configured to be mounted to a support structure at the first and second mounting points, respectively;
wherein the first arm is configured to have a plurality of end terminals of respective strand sections connected thereto along a length of the first arm; and
wherein the first arm is curved such that a convex surface of the first arm faces away from the second arm and such that the vertex point, the first mounting point and the second mounting point define a triangle in which an internal angle between a side of the triangle defined by the vertex point and the first mounting point, and a base of the triangle defined by the first and second mounting points is less than 90 degrees.

The second arm may be curved such that a convex surface of the second arm faces away from the first arm.

The first arm and/or the second arm may have a shape of an elliptical quadrant or portion thereof.

The first and second arms may be configured to be mounted at the first and second mounting points, respectively, to a base plate mounted to the support structure.

The first and second arms may be configured at the first and second mounting points, respectively, to be directly mounted to the support structure.

The first and second arms may be integrally formed.

In one embodiment a clothesline assembly is provided comprising:
- a pair of brackets as described above;
- the plurality of strand sections; and
- pairs of the end terminals for interconnecting each strand section and the first arms of each bracket.

The clothesline assembly may further comprise a pair of base plates for mounting the pair of brackets to the support structure. The clothesline assembly may further comprise a pair of locking pins for releasably fixing the pair of brackets relative to the pair of base plates in a use-orientation.

In a use-orientation, the second arms of the respective brackets may be generally lower than the first arms, such that in a storage-orientation, distances between connection points of wire sections to the first arms of the respective brackets may be shorter than in the use-orientation.

Figure 7:
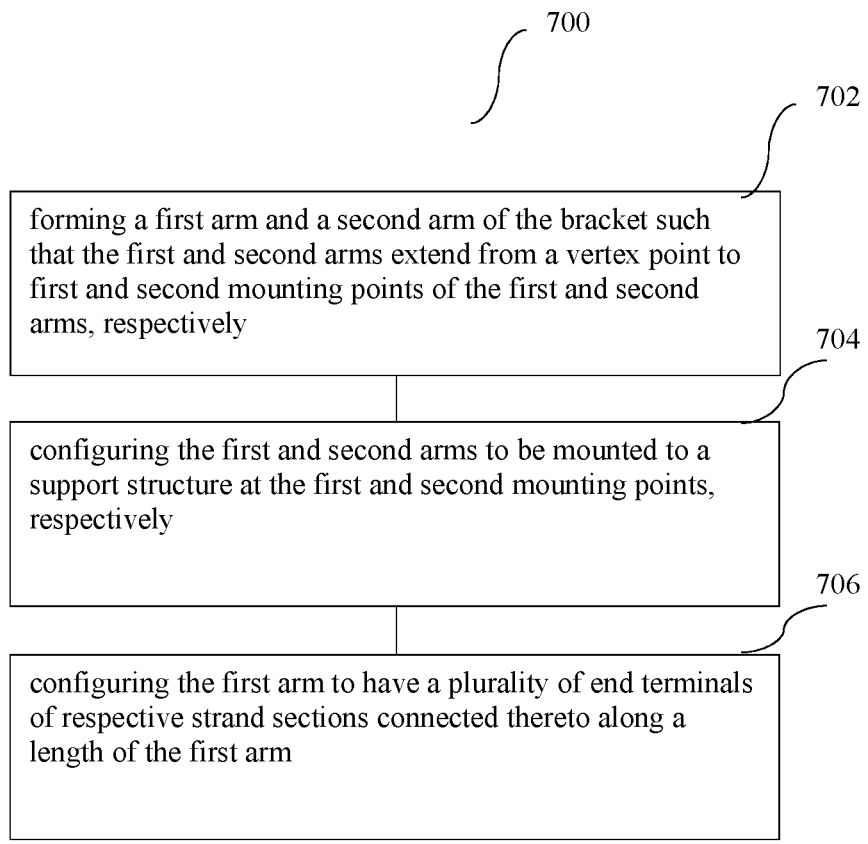
FIG. 7 shows a flowchart illustrating a method of fabricating a bracket for a clothesline assembly, according to an example embodiment.

FIG. 7 shows a flowchart 700 illustrating a method of fabricating a bracket for a clothesline assembly, according to an example embodiment. At step 702, a first arm and a second arm of the bracket are formed such that the first and second arms extend from a vertex point to first and second mounting points of the first and second arms, respectively. At step 704, the first and second arms are configured to be mounted to a support structure at the first and second mounting points, respectively. At step 706, the first arm is configured to have a plurality of end terminals of respective strand sections connected thereto along a length of the first arm, wherein the first arm is curved such that a convex surface of the first arm faces away from the second arm and such the vertex point, the first mounting point and the second mounting point define a triangle in which an internal angle between a side of the triangle defined by the vertex point and the first mounting point, and a base of the triangle defined by the first and second mounting points is less than 90 degrees.

The second arm may be curved such that a convex surface of the second arm faces away from the first arm.

The first arm and/or the second arm may be formed in a shape of an elliptical quadrant or portion thereof.

The first and second arms may be configured to be mounted at the first and second mounting points, respectively, to a base plate mounted to the support structure.

The first and second arms may be configured at the first and second mounting points, respectively, to be directly mounted to the support structure.

The first and second arm may be integrally formed.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims.

Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A clothesline assembly comprising:
a pair of brackets, each bracket including:
   a first arm; and
   a second arm connected to the first arm at a vertex point such that the first and second arms extend from the vertex point to first and second mounting points of the first and second arms, respectively;
   wherein each of the first and second arms are configured to be mounted to a support structure at the first and second mounting points, respectively;
   wherein the first arm is configured to have a plurality of end terminals of respective strand sections connected thereto along a length of the first arm; and
   wherein the first arm is curved such that a convex surface of the first arm faces away from the second arm and such that the vertex point, the first mounting point and the second mounting point define a triangle in which an internal angle between a side of the triangle defined by the vertex point and the first mounting point, and a base of the triangle defined by the first and second mounting points is less than 90 degrees;
the plurality of strand sections; and
pairs of the end terminals for interconnecting each strand section and the first arms of each bracket;
wherein, in a use-orientation, the second arms of the respective brackets are lower than the first arms, such that in a storage-orientation, distances between end terminals of respective strand sections to the first arms of the respective brackets are shorter than in the use-orientation.

2. The clothesline assembly of claim 1, wherein, with respect to each bracket, the second arm is curved such that a convex surface of the second arm faces away from the first arm.

3. The clothesline assembly of claim 1, wherein, with respect to each bracket, the first arm and/or the second arm has a shape of an elliptical quadrant or portion thereof.

4. The clothesline assembly of claim 1, wherein, with respect to each bracket, the first and second arms are configured to be mounted at the first and second mounting points, respectively, to a base plate mounted to the support structure.

5. The clothesline assembly of claim 1, wherein, with respect to each bracket, the first and second arms are configured at the first and second mounting points, respectively, to be directly mounted to the support structure.

6. The clothesline assembly of claim 1, wherein, with respect to each bracket, the first and second arm are integrally formed.

7. The clothesline assembly of claim 1, further comprising a pair of base plates for mounting the pair of brackets to the support structure.

8. The clothesline assembly of claim 7, further comprising a pair of locking pins for releasably fixing the pair of brackets relative to the pair of base plates in a use-orientation.

* * * * *